United States Patent
Elder et al.

(10) Patent No.: US 11,014,995 B2
(45) Date of Patent: May 25, 2021

(54) PROCATALYST COMPOSITION MADE WITH A COMBINATION OF INTERNAL ELECTRON DONORS

(71) Applicant: W. R. Grace & Co.—Conn., Columbia, MD (US)

(72) Inventors: Michael J. Elder, Baltimore, MD (US); Ronald A. Epstein, Montclair, NJ (US); Timothy A. Boyer, Eldersburg, MD (US); Courtney S. Spain, Laurel, MD (US); Michael S. Miller, Catonsville, MD (US)

(73) Assignee: W.R. Grace & Co.—Conn., Columbia, MD (US)

( * ) Notice: Subject to any disclaimer, the term of this patent is extended or adjusted under 35 U.S.C. 154(b) by 43 days.

(21) Appl. No.: 16/334,420

(22) PCT Filed: Sep. 28, 2017

(86) PCT No.: PCT/US2017/053863
§ 371 (c)(1),
(2) Date: Mar. 19, 2019

(87) PCT Pub. No.: WO2018/067367
PCT Pub. Date: Apr. 12, 2018

(65) Prior Publication Data
US 2019/0211118 A1 Jul. 11, 2019

Related U.S. Application Data

(60) Provisional application No. 62/404,794, filed on Oct. 6, 2016.

(51) Int. Cl.
| | | |
|---|---|---|
| *C08F 4/649* | (2006.01) | |
| *C08F 4/659* | (2006.01) | |
| *C08F 210/02* | (2006.01) | |
| *C08F 210/06* | (2006.01) | |
| *C08F 10/06* | (2006.01) | |
| *C08F 4/651* | (2006.01) | |
| *C08F 4/654* | (2006.01) | |
| *C08F 110/06* | (2006.01) | |
| *C08F 4/646* | (2006.01) | |

(52) U.S. Cl.
CPC .......... *C08F 4/6494* (2013.01); *C08F 4/651* (2013.01); *C08F 4/654* (2013.01); *C08F 4/6543* (2013.01); *C08F 4/65916* (2013.01); *C08F 10/06* (2013.01); *C08F 110/06* (2013.01); *C08F 210/02* (2013.01); *C08F 210/06* (2013.01); *C08F 4/6465* (2013.01); *C08F 2500/12* (2013.01); *Y02P 20/52* (2015.11)

(58) Field of Classification Search
CPC .. C08F 4/6494; C08F 4/65916; C08F 4/6543; C08F 10/06; C08F 4/654; C08F 210/06
See application file for complete search history.

(56) References Cited

U.S. PATENT DOCUMENTS

| | | | |
|---|---|---|---|
| 4,315,835 A | 2/1982 | Scata et al. | |
| 4,399,054 A | 8/1983 | Ferraris et al. | |
| 4,442,276 A | 4/1984 | Kashiwa et al. | |
| 4,460,701 A | 7/1984 | Terano et al. | |
| 4,469,648 A | 9/1984 | Ferraris et al. | |
| 4,540,679 A | 9/1985 | Arzoumanidis et al. | |
| 4,547,476 A | 10/1985 | Terano et al. | |
| 4,829,037 A | 5/1989 | Terano et al. | |
| 5,028,671 A | 7/1991 | Kioka et al. | |
| 5,066,737 A | 11/1991 | Job | |
| 5,082,907 A | 1/1992 | Job | |
| 5,095,153 A | 3/1992 | Agnes et al. | |
| 5,247,031 A | 9/1993 | Kioka et al. | |
| 5,468,698 A * | 11/1995 | Koskinen | C08F 10/00 502/107 |
| 5,476,824 A | 12/1995 | Koskinen et al. | |
| 5,905,050 A | 5/1999 | Koshinen et al. | |
| 6,127,304 A | 10/2000 | Sacchetti et al. | |
| 6,329,315 B1 | 12/2001 | Denton et al. | |
| 6,395,670 B1 | 5/2002 | Morini et al. | |
| 7,388,061 B2 † | 6/2008 | Gao | |
| 7,893,003 B2 | 2/2011 | Chen | |
| 8,536,372 B2 | 9/2013 | Chen et al. | |
| 8,604,235 B2 | 12/2013 | Chen et al. | |
| 9,045,570 B2 * | 6/2015 | Chen | C08F 110/06 |

(Continued)

FOREIGN PATENT DOCUMENTS

| | | |
|---|---|---|
| EP | 0728724 | 8/1996 |
| EP | 0728769 | 8/1996 |

(Continued)

OTHER PUBLICATIONS

PCT/US17/53863, International Search Report and Written Opinion, dated Jan. 11, 2018.

(Continued)

*Primary Examiner* — Catherine S Branch

(74) *Attorney, Agent, or Firm* — Dority & Manning, P.A.

(57) ABSTRACT

A phthalate-free procatalyst composition is disclosed for olefin polymerization that exhibits excellent polymerization activity and response to hydrogen, and can produce a polyolefin exhibiting high stereoregularity, high melt flow rate, and desirable molecular weight distribution. The method for producing the procatalyst composition includes reaction of a magnesium support precursor with a tetravalent titanium halide and a combination of different internal electron donors. The first internal electron donor may comprise one or more substituted phenylene aromatic diester and the second internal electron donor may comprise a polyether, preferably a 1,3-diether. In one embodiment, the support precursor comprises a spherical spray crystalized $MgCl_2$-EtOH adduct.

20 Claims, No Drawings

(56) References Cited

U.S. PATENT DOCUMENTS

| | | |
|---|---|---|
| 9,284,392 B2 | 3/2016 | Chang |
| 9,534,063 B2 | 1/2017 | Chen et al. |
| 10,358,505 B2 | 7/2019 | Chen et al. |
| 10,730,971 B2 * | 8/2020 | Zuideveld ............... C08F 10/06 |
| 2010/0267911 A1 | 10/2010 | Gonzalez et al. |
| 2010/0273641 A1 | 10/2010 | Chen et al. |
| 2010/0273966 A1 | 10/2010 | Chen et al. |
| 2013/0053521 A1 | 2/2013 | Singala et al. |
| 2013/0261273 A1 | 10/2013 | Chen et al. |
| 2014/0163184 A1 | 6/2014 | Chen et al. |
| 2015/0259443 A1 | 9/2015 | Guidotti et al. |
| 2016/0280808 A1 | 9/2016 | Chen et al. |
| 2017/0240665 A1 | 8/2017 | Zuideveld et al. |

FOREIGN PATENT DOCUMENTS

| | | | |
|---|---|---|---|
| EP | 1840138 A1 † | 10/2007 | |
| RU | 2497834 C2 | 5/2010 | |
| WO | 199957160 A1 † | 11/1999 | |
| WO | WO2011/107370 | 9/2011 | |
| WO | WO2013/016478 | 1/2013 | |
| WO | WO 2013/074087 | 5/2013 | |
| WO | WO2014/013401 | 1/2014 | |
| WO | 2014118165 A1 † | 8/2014 | |
| WO | 2014149628 A1 † | 9/2014 | |

OTHER PUBLICATIONS

Chen, U.S. Appl. No. 61/141,959, filed Dec. 31, 2008.
Translated Russian Search Report Corresponding to Application No. 2019113132 dated Dec. 22, 2020.

\* cited by examiner
† cited by third party

PROCATALYST COMPOSITION MADE WITH A COMBINATION OF INTERNAL ELECTRON DONORS

CROSS REFERENCE TO RELATED APPLICATIONS

This application is the U.S. National Stage entry of International Application Number PCT/US2017/053863 filed under the Patent Cooperation Treaty and having a filing date of Sep. 28, 2017, which claims priority to U.S. Provisional Application No. 62/404,794 having a filing date of Oct. 6, 2016, all of which are hereby incorporated by reference herein in their entirety for all purposes.

BACKGROUND

Polyolefin polymers are used in numerous and diverse applications and fields. Polyolefin polymers, for instance, are thermoplastic polymers that can be easily processed. The polyolefin polymers can also be recycled and reused. Polyolefin polymers are formed from hydrocarbons, such as ethylene and alpha-olefins, which are obtained from petrochemicals and are abundantly available.

Polypropylene polymers, which are one type of polyolefin polymers, generally have a linear structure based on a propylene monomer. Polypropylene polymers can have various different stereospecific configurations. Polypropylene polymers, for example, can be isotactic, syndiotactic, and atactic. Isotactic polypropylene is perhaps the most common form and can be highly crystalline. Polypropylene polymers that can be produced include homopolymers, modified polypropylene polymers, and polypropylene copolymers which include polypropylene terpolymers. By modifying the polypropylene or copolymerizing the propylene with other monomers, various different polymers can be produced having desired properties for a particular application. For example, polypropylene copolymers can be produced having elastomeric properties which greatly enhances the impact strength of the polymers.

Ziegler-Natta catalysts typically comprise the reaction product between compounds containing a Group IV transition metal and an organoaluminum compound. The transition metal component is often referred to as the procatalyst, while the organoaluminum compound is referred to as the cocatalyst.

One type of Ziegler-Natta catalyst used in the production of polyolefins comprises $TiCl_3$ based catalyst components, obtained for example by the reduction of $TiCl_4$ with aluminum-alkyls, used in combination with aluminum compounds. The above described catalysts, however, are known to have relatively low activity which can result in relatively large amounts of catalytic residues in the resulting polymer.

Another type of catalyst used to produce polyolefin polymers comprises a magnesium dihalide on which are supported a titanium compound and an internal electron donor compound. In order to maintain high selectivity for an isotactic polymer product, a variety of internal electron donor compounds have been proposed. In addition, external electron donor compounds have been added, such as an alkoxysilane, in addition to the use of various other components that are added in order to further control the polymerization process.

Phthalates have found wide use as internal electron donors in Ziegler-Natta catalysts for polypropylene. In combination with a silane external electron donor, they are capable of providing good polymerization performance in terms of catalytic activity and resulting polymer properties. However, developments in polypropylene products and processing equipment have created a need for additional catalyst capability. A need remains for a catalyst system that has equal or better catalyst activity in comparison to previously used catalyst systems with higher stereoselectivity and improved hydrogen response. A need particularly exists for a catalyst system with these improved properties and an optimal molecular weight distribution capable of covering a variety of end use products.

Recently those skilled in the art have been attempting to further improve catalyst performance by creating new catalytic systems with internal donors other than phthalates. For example, U.S. Pat. No. 9,284,392, PCT Publication No. WO2009/085649, PCT Publication No. WO2014/048964, U.S. Pat. Nos. 8,536,372, 8,604,235, PCT Publication No. WO2010/078494, PCT Publication No. WO2010/021762, PCT Publication No. WO2013/074087 and U.S. Pat. No. 6,329,315 all describe various different catalytic systems and which are all incorporated herein by reference.

SUMMARY

In general, the present disclosure is directed to a catalyst system for producing polyolefin polymers that utilizes a mixture of two non-phthalate internal electron donors. By controlling the relative amounts of the different internal electron donors and/or by controlling different process conditions, the catalyst system of the present disclosure displays increased activity, increased stereoselectivity, and high/improved hydrogen response. The catalyst also provides a more optimal polymer molecular weight distribution than catalysts based on the single internal electron donor.

Due to the enhanced catalytic activity and improved properties the catalyst system of the present disclosure is particularly well suited to producing polypropylene.

In one embodiment, the present disclosure is directed to a procatalyst composition comprises a combination of a magnesium moiety (procatalyst precursor), a titanium moiety, and a mixed internal electron donor. The mixed internal electron donor comprises at least a first internal electron donor and a second internal electron donor.

The procatalyst precursor can include (i) magnesium, (ii) a transition metal compound from Periodic Table groups IV-VII, (iii) a halide, an oxyhalide, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof. In one embodiment the procatalyst precursor is a spray crystallized magnesium dihalide support. The magnesium dihalide support, for instance, can have a substantially spherical shape. The magnesium dihalide support, which may comprise magnesium dichloride, can have an average particle diameter (d50) of from about 30 microns to about 150 microns, more preferably from about 40 microns to about 80 microns.

In accordance with the present disclosure, the above described procatalyst precursor is combined with a combination of internal electron donors. The first internal electron donor may comprise various different compounds depending upon the particular application. In one embodiment, the first internal electron donor comprises a non-phthalate and non-succinate internal electron donor. For instance, the first internal electron donor may comprise a malonate. In an alternative embodiment, the first internal electron donor comprises a phenylene dicarboxylic acid ester. For example, the first internal electron donor may comprise a substituted phenylene aromatic diester having the following structure (I):

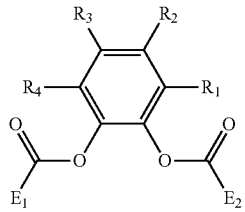

where $R_1$-$R_4$ are the same or different, each of $R_1$-$R_4$ is selected from the group consisting of hydrogen, a substituted hydrocarbyl group having 1 to 20 carbon atoms, an unsubstituted hydrocarbyl group having 1 to 20 carbon atoms, a substituted or unsubstituted aryl group having 6 to 20 carbon atoms, an alkoxy group having 1 to 20 carbon atoms, a heteroatom, and combinations thereof, and at least one of $R_1$-$R_4$ is not hydrogen; and at least one or two, or three, or four R groups of $R_1$-$R_4$ is selected from a substituted hydrocarbyl group having 1 to 20 carbon atoms, an unsubstituted hydrocarbyl group having 1 to 20 carbon atoms, an aryl group having 6 to 20 carbon atoms, an alkoxy group having 1 to 20 carbon atoms, a heteroatom, and combinations thereof, and where $E_1$ and $E_2$ are the same or different and selected from groups containing 1 to 20 carbon atoms, including alkyl, substituted alkyl, aryl, substituted aryl or a functional group optionally containing heteroatoms such as a functional group without an active hydrogen.

In one embodiment, the substituted phenylene aromatic diester may have the following structure:

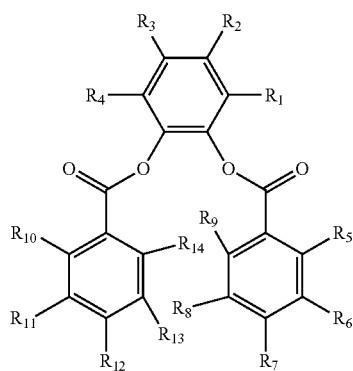

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen. Particular examples of the first internal electron donor are 3-methyl-5-tert-butyl-1,2-phenylene dibenzoate and 3,5-diisopropyl-1,2-phenylene dibenzoate.

In one embodiment, the second internal electron donor may comprise a substituted 1,3-diether of structure II:

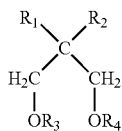

where $R_1$, $R_2$, $R_3$, and $R_4$ are the same or different, methyl, $C_2$-$C_{18}$ linear or branched alkyls, $C_3$-$C_{18}$ cycloalkyls, $C_4$-$C_{18}$ cycloalkyl-alkyl, $C_4$-$C_{18}$ alkyl-cycloalkyl, phenyl, organosilicon, $C_7$-$C_{18}$ arylalkyl, $C_7$-$C_{18}$ alkylaryl radicals; $R_1$ or $R_2$ may also be a hydrogen atom.

In another embodiment the second internal electron donor may comprise a 1,3-diether with cyclic or polycyclic structure III:

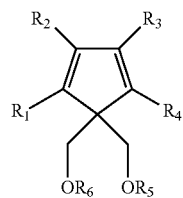

where $R_1$ through $R_6$ are as described for $R_1$ through $R_4$ of the structure above. $R_1$ through $R_4$ may optionally be a hydrogen atom or combined to form one or more $C_5$-$C_7$ fused aromatic or non-aromatic ring structures, optionally containing an N, O, or S heteroatom. Particular examples of the second internal electron donor include 4,4-bis(methoxymethyl)-2,6-dimethyl heptane, 9,9-bis(methoxymethyl)fluorene, or mixtures thereof.

The procatalyst precursor is converted to a solid procatalyst by further reaction (halogenation) with an inorganic halide compound, preferably a titanium halide compound, and incorporation of the internal electron donors. If not already incorporated into the precursor in sufficient quantity, the internal electron donors may be added separately before, during, or after halogenation. This procedure may be repeated one or more times, optionally in the presence of additional additives or adjuvants, and the final solid product washed with an aliphatic solvent.

In one embodiment, a spherical $MgCl_2$-EtOH precursor is halogenated by reaction with excess $TiCl_4$ and the second internal electron donor as described above is added prior to contacting the activated support with the first internal electron donor. Contact times of the procatalyst precursor with the internal electron donors can be at least about 15 minutes, such as at least about 30 minutes, such as at least about 1 hour at a temperature of at least about 25° C., such as at least about 60° C., and up to a temperature of less than about 140° C., preferably up to a temperature between about 100 to 125° C. In one embodiment the reaction with $TiCl_4$ is repeated at least two more times at elevated temperature prior to washing the final procatalyst with an aliphatic solvent.

Although unknown, it is believed that in certain embodiments, contacting the activated support with the second internal electron donor prior to the first internal electron donor may further increase the amount of the first internal electron donor that is incorporated into the procatalyst composition. For example, the percentage of the first internal electron donor that is incorporated into the procatalyst composition can be greater than about 35%, in some conditions greater than 60% of the original charge of the first internal electron donor. In comparison, in the past, many internal electron donors had retention rates of less than 25%, such as even less than 20%.

The present disclosure is also directed to a catalyst system for production of polyolefin polymers. The catalyst system includes a procatalyst composition as described above in combination with a cocatalyst and optionally an external electron donor.

The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In one embodiment, preferred cocatalysts are selected from triethylaluminum, triisobutylaluminum, tri-n-hexylaluminum, diisobutylaluminum hydride, and di-n-hexylaluminum hydride, with the most preferred cocatalyst being triethylaluminum.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

The external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide. In one embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C3-_{12}$ branched alkyl, or $C_{3-12}$ cyclic or acyclic amino group, R' is $C_{1-4}$ alkyl, and m is 1 or 2. In a preferred embodiment, the silane composition is dicyclopentyldimethoxysilane (DCPDMS), methylcyclohexyldimethoxysilane (MChDMS), diisopropyldimethoxysilane (DIPDMS), or n-propyltrimethoxysilane (NPTMS), and any combination of thereof.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). The activity limiting agent may be a carboxylic acid ester, a diether, a poly(alkene glycol), poly(alkene glycol)ester, a diol ester, and combinations thereof.

The present disclosure is also further directed to a polymerization process for producing a polyolefin polymer using the procatalyst and catalyst compositions as described above. In one embodiment, the process is directed to producing a polypropylene polymer. As used herein, a polypropylene polymer refers to a polypropylene homopolymer, copolymer including random copolymers, terpolymer, heterophasic copolymer, an impact copolymer, and the like.

The polymerization process can be carried out according to known techniques, for example gas phase in fluidized bed or stirred bed reactors, slurry polymerization using an inert hydrocarbon solvent as diluent, or slurry polymerization using liquid monomer as reactant and diluent. In one embodiment, the polymerization process can be a hybrid process, for example bulk propylene liquid loop reactor(s) coupled with gas phase reactor(s).

In addition to increasing the catalytic activity, the combination of the first internal electron donor and the second internal electron donor in the procatalyst formulations has been found to produce polymers with a highly desirable combination of properties. The polyolefin polymer produced by the process, for instance, can have a molecular weight distribution that is optimal for many end use applications. For example, the polyolefin polymer can have a Polydispersity Index (PDI) of from about 4.1 to about 5.0, such as from about 4.2 to about 4.8. Catalysts of the present disclosure also provide increased hydrogen response relative to phthalate catalysts and have improved stereoselectivity. Certain formulations are able to achieving very low xylene solubles of 1.0 wt % or less while providing polymer with a higher melt flow rate.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to non-phthalate-based catalyst systems for producing polyolefin polymers, particularly polypropylene polymers. The present disclosure is also directed to a procatalyst composition, to a method of making the procatalyst composition, catalyst systems using the procatalyst, and to methods of polymerizing and copolymerizing olefins using the catalyst systems. In general, the present disclosure is directed to a procatalyst composition comprising titanium, magnesium chloride in active form, and a combination of internal electron donor compounds containing at least one substituted polyether.

In accordance with the present disclosure, the use of a combination of internal electron donors comprising a first internal electron donor combined with at least one polyether provides catalysts with high/improved activity, high stereoselectivity, and improved hydrogen response. A synergistic effect was found using the two internal donors favoring higher stereoselectivity than catalysts based on the individual donors. It is also desirable for the catalyst to produce polymer with a molecular weight distribution (or polydispersity index, PDI) that is neither too narrow nor too broad and capable of covering a variety of end use products. Polypropylene produced with catalysts of the present disclosure has a PDI similar to or slightly broader than PDI obtained with phthalate catalysts.

Unexpectedly, the second internal electron donor has been found to increase the efficiency of incorporation of the first internal electron donor into the procatalyst composition. In particular, greater amounts of the first internal electron donor are incorporated into the procatalyst composition when the second internal electron donor is present. Consequently, less of the first internal electron donor is consumed and/or wasted during the process of making the procatalyst.

The procatalyst composition of the present disclosure is generally made by combining an active support made from a magnesium moiety with a combination of internal electron donors and a titanium halide.

In an embodiment of the present disclosure, a procatalyst precursor is first created. The procatalyst precursor can include (i) magnesium, (ii) a transition metal compound from Periodic Table groups IV-VII, (iii) a halide, an oxylahilde, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof.

In an embodiment, the procatalyst precursor contains magnesium as the sole metal component. Non limiting examples include anhydrous magnesium chloride and/or its alcohol adduct, magnesium alkoxide, and or aryloxide, mixed magnesium alkoxy halide, and/or carboxylated magnesium dialkoxide or aryloxide.

In one embodiment, the procatalyst precursor is an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

The magnesium procatalyst precursors may be formed into uniform particles through various methods known in the art. Several of these methods are described, inter alia, in U.S. Pat. Nos. 5,468,698, 5,476,824, 5,905,050, 4,315,835, 4,469,648, 4,399,054, 6,127,304, 5,082,907, 5,066,737, 4,442,276, 4,540,679, 4,547,476, 4,460,701, 4,829,037, 5,028,671, 5,247,031, and elsewhere which are incorporated herein by reference.

In one embodiment, a substantially spherical $MgCl_2$-nEtOH adduct may be formed by a spray crystallization process. In the process, a $MgCl_2$-nROH melt, where n is 1-6, is sprayed inside a vessel while conducting inert gas at a temperature of 20-80° C. into the upper part of the vessel. The melt droplets are transferred to a crystallization area into which inert gas is introduced at a temperature of −50 to 20° C. crystallizing the melt droplets into nonagglomerated, solid particles of spherical shape. The spherical $MgCl_2$ particles are then classified into the desired size. Particles of undesired size can be recycled. In preferred embodiments for procatalyst synthesis the spherical $MgCl_2$ precursor has an average particle size (Malvern $d_{50}$) of between about 15-150 microns, preferably between 20-100 microns, and most preferably between 35-85 microns.

The preparation of the procatalyst precursor can involve halogenation of mixed magnesium and titanium alkoxides, and may involve the use of one or more other compounds known as clipping agents which can include trialkylborate compounds.

In one embodiment, the procatalyst precursor contains a transition metal compound and a magnesium metal compound. The transition metal compound has the general formula $TrX_x$ where Tr is the transition metal, X is a halogen or a $C_{1-10}$ hydrocarboxyl or hydrocarbyl group, and x is the number of such X groups in the compound in combination with a magnesium metal compound. Tr may be a Group IV, V or VI metal. In one embodiment, Tr is a Group IV metal, such as titanium. X may be chloride, bromide, $C_{1-4}$ alkoxide or phenoxide, or a mixture thereof. In one embodiment, X is chloride.

The precursor composition may be prepared by the chlorination of the foregoing mixed magnesium compounds, titanium compounds, or mixtures thereof In one embodiment, the precursor composition is a mixed magnesium/titanium compound of the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 56; or 2-4, or 3; f is 2 to 116, or 5 to 15; and g is 0.5 to 116, or 1 to 3. The precursor may be prepared by controlled precipitation through removal of an alcohol from the reaction mixture used in its preparation. In one embodiment, the reaction medium includes a mixture of an aromatic liquid, especially a chlorinated aromatic compound, such as chlorobenzene or chlorinated toluene, with an alkanol, especially ethanol, and an inorganic chlorinating agent. Suitable inorganic chlorinating agents include chlorine derivatives of silicon, aluminum and titanium, such as titanium tetrachloride or titanium trichloride, and titanium tetrachloride in particular. Removal of the alkanol from the solution used in the chlorination, results in precipitation of the solid precursor, having a desirable morphology and surface area. Moreover, the resulting precursor is particularly uniform in particle sized and resistant to particle crumbling as well as degradation of the resulting procatalyst.

In accordance with the present disclosure, the above described procatalyst precursor is combined with a combination of internal electron donors. The first internal electron donor may comprise various different compounds depending upon a particular application. In one embodiment, the first internal electron donor comprises a non-phthalate and non-succinate internal electron donor. For example, the first internal electron donor may comprise a malonate. In an alternative embodiment, the first internal electron donor comprises a phenylene dicarboxylic acid ester, such as a substituted phenylene aromatic diester. The second internal electron donor comprises a polyether.

In one embodiment, the first internal electron donor comprises a phenylene dicarboxylic acid ester, such as a substituted phenylene aromatic diester having the following structure.

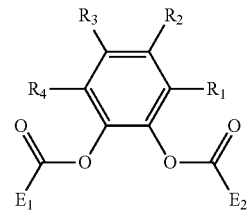

where $R_1$-$R_4$ are the same or different, each of $R_1$-$R_4$ is selected from the group consisting of hydrogen, a substituted hydrocarbyl group having 1 to 20 carbon atoms, an unsubstituted hydrocarbyl group having 1 to 20 carbon atoms, a substituted or unsubstituted aryl group having 6 to 20 carbon atoms, an alkoxy group having 1 to 20 carbon atoms, a heteroatom, and combinations thereof, and at least one of $R_1$-$R_4$ is not hydrogen; and at least one or two, or three, or four R groups of $R_1$-$R_4$ is selected from a substituted hydrocarbyl group having 1 to 20 carbon atoms, an unsubstituted hydrocarbyl group having 1 to 20 carbon atoms, a substituted or unsubstituted aryl group having 6 to 20 carbon atoms, an alkoxy group having 1 to 20 carbon atoms, a heteroatom, and combinations thereof, and where $E_1$ and $E_2$ are the same or different and selected from the group consisting of alkyl, substituted alkyl, aryl, substituted aryl or an inert functional group optionally containing heteroatoms wherein all have from 1 to 20 carbon atoms.

The substituted phenylene aromatic diester, for instance, can have the following structure:

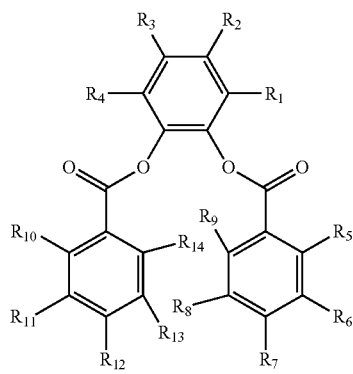

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen.

In one embodiment, the substituted phenylene aromatic diester may be any substituted phenylene aromatic diester as disclosed in U.S. Patent Application Ser. No. 61/141,959 filed on Dec. 31, 2008, the entire content of which is incorporated by reference herein.

In one embodiment, the substituted phenylene aromatic diester may be any substituted phenylene aromatic diester disclosed in WO12088028, filed on Dec. 20, 2011, the entire content of which is incorporated by reference herein.

In one embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In one embodiment, the inter-/intra-cyclic structure is a $C_5$ or a $C_6$ membered ring.

In one embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In one embodiment, any consecutive R groups in $R_1$-$R_4$, and/or in $R_5$-$R_9$, and/or in $R_{10}$-$R_{14}$, may be members of a $C_5$-$C_6$-membered ring.

In one embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In one embodiment, structure (I) includes $R_2$ that is methyl, and each of $R_5$-$R_{14}$ is hydrogen.

In one embodiment, structure (I) includes $R_2$ that is ethyl, and each of $R_5$-$R_{14}$ is hydrogen.

In one embodiment, structure (I) includes $R_2$ that is t-butyl, and each of $R_5$-$R_{14}$ is hydrogen.

In one embodiment, structure (I) includes $R_2$ that is ethoxycarbonyl, and each of $R_5$-$R_{14}$ is hydrogen.

In one embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ that is methyl, and each of $R_5$-$R_{14}$ is hydrogen.

In one embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In one embodiment, structure (I) includes $R_1$ that is a methyl group and $R_3$ that is a t-butyl group. Each of $R_2$, $R_4$ and $R_5$-$R_{14}$ is hydrogen.

In one embodiment, structure (I) includes $R_1$ and $R_3$ that is an isopropyl group. Each of $R_2$, $R_4$ and $R_5$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In one embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In one embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In one embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

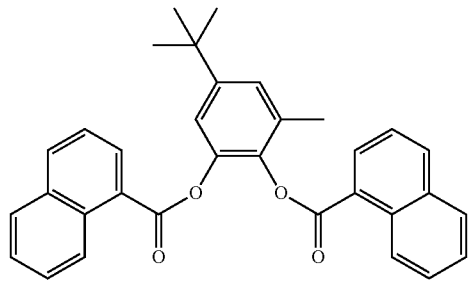 [SMILES: Cc1cc(C(C)(C)C)cc(OC(=O)c2cccc3ccccc23)c1OC(=O)c1cccc2ccccc12]

In one embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

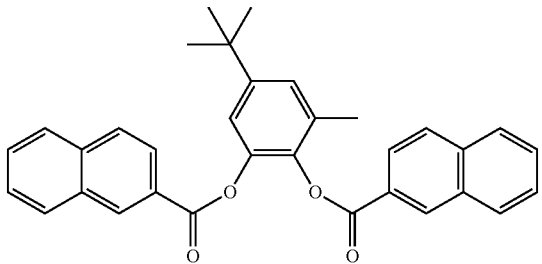 [SMILES: Cc1cc(C(C)(C)C)cc(OC(=O)c2ccc3ccccc3c2)c1OC(=O)c1ccc2ccccc2c1]

In one embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In one embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In one embodiment, structure (I) includes $R_1$ that is a methyl group and $R_3$ is a t-butyl group. Each of $R_2$, $R_4$ and $R_5$-$R_{14}$ is a fluorine atom.

In one embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$ and $R_{14}$ is hydrogen.

In one embodiment, $R_1$ is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In one embodiment, structure (I) includes $R_1$ and $R_3$, each of which is a sec-butyl group. Each of $R_2$, $R_4$ and $R_5$-$R_{14}$ is hydrogen.

In one embodiment, the substituted phenylene aromatic diester has a structure (IV) whereby $R_1$ and $R_2$ are members of a $C_6$ membered ring to form a 1,2-naphthalene moiety. Each of $R_5$-$R_{14}$ is hydrogen. Structure (IV) is provided below.

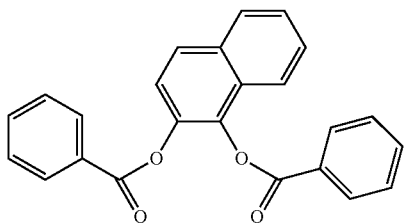 [SMILES: O=C(Oc1ccc2ccccc2c1OC(=O)c1ccccc1)c1ccccc1]

In one embodiment, the substituted phenylene aromatic diester has a structure (V) whereby $R_2$ and $R_3$ are members of a $C_6$ membered ring to form a 2,3-naphthalene moiety. Each of $R_5$-$R_{14}$ is hydrogen. Structure (V) is provided below.

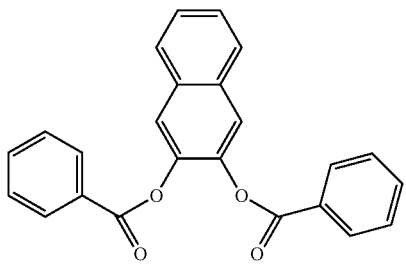 [SMILES: O=C(Oc1cc2ccccc2cc1OC(=O)c1ccccc1)c1ccccc1]

In one embodiment, structure (I) includes $R_1$ and $R_4$ that are each a methyl group. Each of $R_2$, $R_3$, $R_5$-$R_9$ and $R_{10}$-$R_{14}$ is hydrogen.

In one embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In one embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In one embodiment, each of $R_1$ and $R_4$ is selected from a methyl group, an ethyl group, and a vinyl group. Each of $R_2$ and $R_3$ is selected from hydrogen, a secondary alkyl group, or a tertiary alkyl group, with $R_2$ and $R_3$ not concurrently being hydrogen. Stated differently, when R2 is hydrogen, R3 is not hydrogen (and vice versa)

The second internal electron donor generally comprises a polyether compound. In one embodiment the second internal electron donor is a substituted 1,3-diether of structure:

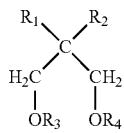

where $R_1$, $R_2$, $R_3$, and $R_4$ are the same or different, methyl, $C_2$-$C_{18}$ linear or branched alkyls, $C_3$-$C_{18}$ cycloalkyls, $C_4$-$C_{18}$ cycloalkyl-alkyl, $C_4$-$C_{18}$ alkyl-cycloalkyl, phenyl, organosilicon, $C_7$-$C_{18}$ arylalkyl, $C_7$-$C_{18}$ alkylaryl radicals; $R_1$ or $R_2$ may also be a hydrogen atom.

In one embodiment the second internal electron donor may comprise a 1,3-diether with cyclic or polycyclic structure:

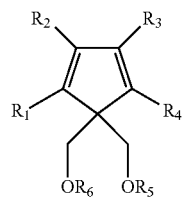

where $R_1$ through $R_6$ are as described for $R_1$ through $R_4$ of the structure above. $R_1$ through $R_4$ may optionally be a hydrogen atom or combined to form one or more $C_5$-$C_7$ fused aromatic or non-aromatic ring structures, optionally containing an N, O, or S heteroatom.

Particular examples of the second internal electron donor include 4,4-bis(methoxymethyl)-2,6-dimethyl heptane, 9,9-bis(methoxymethyl)fluorine, or mixtures thereof.

Further examples of diether compounds that may be used as the second internal electron donor comprise 1,3-dimethoxy-2,2-dimethylpropane; 1-methoxy-2-(methoxymethyl)-2-methylbutane; 1-methoxy-2-(methoxymethyl)-2-methylpentane; 1-methoxy-2-(methoxymethyl)-2-methylhexane; 1-methoxy-2-(methoxymethyl)-2-methylheptane; 1-methoxy-2-(methoxymethyl)-2-methyloctane; 1-methoxy-2-(methoxymethyl)-2-methylnonane; 1-methoxy-2-(methoxymethyl)-2-methyldecane; 1-methoxy-2-(methoxymethyl)-2-methylundecane; 1-methoxy-2-(methoxymethyl)-2-methyldodecane; 1-methoxy-2-(methoxymethyl)-2-methyltetradecane; 1-methoxy-2-(methoxymethyl)-2-methylhexadecane; 1-methoxy-2-(methoxymethyl)-2-methyloctadecane; 1-methoxy-2-(methoxymethyl)-2-methylicosane; 1-methoxy-2-(methoxymethyl)-2-methyldocosane; 1-methoxy-2-(methoxymethyl)-2,3-dimethylbutane; 1-methoxy-2-(methoxymethyl)-2,4-dimethylpentane; 1-methoxy-2-(methoxymethyl)-2,5-dimethylhexane; 1-methoxy-2-(methoxymethyl)-2,6-dimethylheptane; 1-methoxy-2-(methoxymethyl)-2,7-dimethyloctane; 1-methoxy-2-(methoxymethyl)-2,8-dimethylnonane; 1-methoxy-2-(methoxymethyl)-2,9-dimethyldecane; 1-methoxy-2-(methoxymethyl)-2,10-dimethylundecane; 1-methoxy-2-(methoxymethyl)-2,11-dimethyldodecane; 1-methoxy-2-(methoxymethyl)-2,13-dimethyltetradecane; 1-methoxy-2-(methoxymethyl)-2,15-dimethylhexadecane; 1-methoxy-2-(methoxymethyl)-2,17-dimethyloctadecane; 1-methoxy-2-(methoxymethyl)-2,19-dimethylicosane; 1-methoxy-2-(methoxymethyl)-2,21-dimethyldocosane; 3,3-bis(methoxymethyl)-2,4-dimethylpentane; 3,3-bis(methoxymethyl)-2,5-dimethylhexane; 3,3-bis(methoxymethyl)-2,6-dimethylheptane; 3,3-bis(methoxymethyl)-2,7-dimethyloctane; 5,5-bis(methoxymethyl)-2,9-dimethyldecane; 4,4-bis(methoxymethyl)-2,7-dimethyloctane; 4,4-bis(methoxymethyl)-2,8-dimethylnonane; 5,5-bis(methoxymethyl)-2,8-dimethylnonane; 6,6-bis(methoxymethyl)-2,10-dimethylundecane; 3,3-bis(methoxymethyl)-2-methylpentane; 4,4-bis(methoxymethyl)-2-methylhexane; 5,5-bis(methoxymethyl)-2-methylheptane; 6,6-bis(methoxymethyl)-2-methyloctane; 6,6-bis(methoxymethyl)-

2-methyldecane; 4,4-bis(methoxymethyl)-2-methylheptane; 5,5-bis(methoxymethyl)-2-methyloctane; 6,6-bis(methoxymethyl)-2-methylnonane; 5,5-bis(methoxymethyl)-2-methylnonane; 6,6-bis(methoxymethyl)-2-methylundecane; 3,3-bis(methoxymethyl)pentane; 3,3-bis(methoxymethyl)hexane; 3,3-bis(methoxymethyl)heptane; 3,3-bis(methoxymethyl)octane; 5,5-bis(methoxymethyl)decane; 4,4-bis(methoxymethyl)heptane; 4,4-bis(methoxymethyl)octane; 4,4-bis(methoxymethyl)nonane; 5,5-bis(methoxymethyl)nonane; 6,6-bis(methoxymethyl)undecane; (1,3-dimethoxy-2-methylpropan-2-yl)cyclohexane; (3-methoxy-2-(methoxymethyl)-2-methylpropyl)cyclohexane; 1-(3-methoxy-2-(methoxymethyl)-2-methylpropyl)-4-methylcyclohexane; 1-(1,3-dimethoxy-2-methylpropan-2-yl)-4-methylcyclohexane; (1,3-dimethoxy-2-methylpropan-2-yl)cyclopentane; 1-(1,3-dimethoxy-2-methylpropan-2-yl)-3-methylcyclopentane, 1,1-bis(methoxymethyl)-cyclopentadiene, 1,1-bis(methoxymethyl)-2,3,4,5,-tetramethylcyclopentadiene, 1,1-bis(methoxymethyl)-2,3,4,5,-tetraphenylcyclopentadiene, 1,1,-bis(methoxymethyl)-2-methyl-4-tert-butylcyclopentadiene, 1,1-bis(methoxymethyl)indene, 1,1-bis(methoxymethyl)-3-methylindene, 1,1-bis(methoxymethyl)-3-tert-butylindene, 1,1-bis(methoxymethyl)-4,7-dimethylindene, 1,1-bis(methoxymethyl)-2-methylindene, 9,9-bis(methoxymethyl)fluorene, 9,9-bis(methoxymethyl)-2,7-di-tert-butylfluorene, 9,9-bis(methoxymethyl)-2,7-diisopropylfluorene, 9,9-bis(methoxymethyl)-1,2,3,4,-tetrahydrofluorene, 4,4-bis(methoxymethyl)cyclopenta[def]phenanthrene, 7,7-bis(methoxymethyl)cyclopentadithiophene, 6,6-bis(methoxymethyl)-5-methyl-dihydroindenoindole, or mixtures thereof.

The precursor is next converted to a solid procatalyst by further reaction (halogenation) with an inorganic halide compound, preferably a titanium halide compound, and incorporation of the internal electron donors. If not already incorporated into the precursor in sufficient quantity, the internal electron donors may be added separately before, during, or after halogenation. This procedure may be repeated one or more times, optionally in the presence of additional additives or adjuvants, and the final solid product washed with an aliphatic solvent. Any method of making, recovering and storing the solid procatalyst is suitable for use in the present disclosure.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, or up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene (MCB), bromobenzene, dichlorobenzenes and chlorotoluenes. The aliphatic halohydrocarbon may be a compound containing at least two chloride substituents such as carbon tetrachloride or 1,1,2-trichloroethane. The aromatic halohydrocarbon may be chlorobenzene or o-chlorotoluene. For purposes of the following embodiments the term "hydrocarbon" may include hydrocarbon or halohydrocarbon solvents.

In the first step included in the method for producing the solid procatalyst, according to one embodiment if the invention, the solid magnesium precursor is brought into contact with the tetravalent titanium halide compound, or a mixture of the tetravalent titanium halide compound and a hydrocarbon solvent. In one embodiment, it is preferred to bring the magnesium precursor into contact with excess tetravalent titanium halide at a temperature below 0° C., preferably below −10° C., and most preferably about −20° C. To effect reaction, the temperature is slowly increased to about 20° C. at a rate of less than 1.0° C./min, preferably less than 0.7° C./min, and most preferably between 0.16 to 0.44° C./min. In one embodiment the internal donor addition is started after the procatalyst reaction mixture reaches a temperature of about 20 to 30° C. In another embodiment, the internal donor is added before the temperature ramp is started. The internal donors can be added neat or as a solution in hydrocarbon solvent. In one embodiment internal donor addition is started at a temperature of about 20° C. and completed by about 60° C. In one embodiment the second internal donor is added during the heat-up period followed by addition of the first internal donor. In another embodiment the first internal donor is added during the heat-up period followed by addition of the second internal donor. In yet another embodiment a mixture of the first and second internal donors is added during the heat-up period. The internal donors can be dosed at a given temperature while suspending the temperature ramp rate or can be metered during the temperature ramp. In one embodiment the second internal donor is added at about 20° C. while suspending the temperature ramp and the first internal donor is metered after restarting the temperature ramp rate. The final temperature of the first step is preferably about 80 to 135° C., and more preferably about 90 to 125° C. The temperature ramp rate for the donor addition portion of the first step may be different from the initial ramp rate and is preferable less than 2.0° C./min, more preferable less than 1.6° C./min, and most preferably between about 0.4 to 1.0° C./min. After reaching final temperature the first step reaction can be continued for a period of time. In one embodiment the reaction is continued from about 20 to 120 minutes, more preferably from about 30 to 90 minutes. After completing the first step reaction, mother liquor is separated from the solid procatalyst. The mother liquor may be separate by a filtration process or by allowing the solid product to settle and decanting the mother liquor. In one embodiment the mother liquor is decanted.

In a second step included in the method for producing the solid procatalyst, according to one embodiment of the invention, the solid product from the first step is reacted at elevated temperature with a second charge of tetravalent titanium halide or a mixture of tetravalent titanium halide and hydrocarbon solvent. In one embodiment the temperature of the second step is conducted at about 90 to 130° C., and more preferably at about 100 to 125° C. In one embodiment, a second amount of the first internal donor, the second internal donor, or a mixture of the first and second internal donors may be added. After completing the second step, the reaction liquid is separated from the solid procatalyst as described above.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon, especially at an elevated temperature between about 50° C. to 100° C., may be employed to remove labile species, especially $TiCl_4$.

Contact times of the procatalyst precursor with the internal electron donors can be at least about 15 minutes, such as at least about 30 minutes, such as at least about 1 hour at a temperature of at least about 25° C., such as at least about 60° C., and up to a temperature of less than about 140° C., such as less than about 130° C.

In one embodiment, the second internal electron donor as described above is contacted with the activated support or procatalyst precursor prior to contacting the activated support with the first internal electron donor. Although unknown, it is believed that in certain embodiments, contacting the activated support with the second internal electron donor prior to the first internal electron donor may further increase the amount of the first internal electron donor that is incorporated into the procatalyst composition.

For example, one of the benefits of the present disclosure is that greater amounts of the first internal electron donor are incorporated into the procatalyst composition when the second internal electron donor is present. For example, the percentage of the first internal electron donor that is incorporated into the procatalyst composition can be greater than about 35% of the original charge of the first internal electron donor. For instance, the procatalyst may retain greater than 40%, such as greater than 45%, such as greater than 55%, such as even greater than 60% of the first internal electron donor. In comparison, in the past, many internal electron donors had retention rates of less than 25%, such as even less than 20%. The use of the second internal electron donor in conjunction with the first internal electron donor unexpectedly and dramatically improves the efficiency of the process and prevents significant waste of the first internal electron donor.

The resulting procatalyst composition can generally contain titanium in an amount from about 0.5% to about 6% by weight, such as from about 1.5% to about 5% by weight, such as from about 2% to about 4% by weight. The solid catalyst can contain magnesium generally in an amount greater than about 5% by weight, such as in an amount greater than about 8% by weight, such as in an amount greater than about 10% by weight, such as in an amount greater than about 12% by weight, such as in an amount greater than about 14% by weight, such as in an amount greater than about 16% by weight. Magnesium is contained in the catalyst in an amount less than about 25% by weight, such as in an amount less than about 23% by weight, such as in an amount less than about 20% by weight. The first internal electron donor and the second internal electron donor combined are generally present in the catalyst composition in an amount less than about 30% by weight, such as in an amount less than about 25% by weight, such as in an amount less than about 22% by weight, such as in an amount less than about 20% by weight, such as in an amount less than about 19% by weight. The internal electron donors are generally present in an amount greater than about 5% by weight, such as in an amount greater than about 9% by weight.

The molar ratio between the first internal electron donor and the second internal electron donor can be carefully controlled in order to produce the desired results. In one embodiment, for instance, greater molar quantities of the second internal electron donor are present in relation to the molar quantities of the first internal electron donor. For example, the molar ratio between the first internal electron donor and the second internal electron donor can generally be from about 20:1 to about 1:20, such as from about 10:1 to about 1:10, such as from about 3:1 to about 1:3.

In one embodiment, the procatalyst composition is combined with a cocatalyst to form a catalyst system. A catalyst system is a system that forms an olefin-based polymer when contacted with an olefin under polymerization conditions. The catalyst system may optionally include an external electron donor, an activity limiting agent, and/or various other components.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In one embodiment, preferred cocatalysts are selected from triethylaluminum, triisobutylaluminum, tri-n-hexylaluminum, diisobutylaluminum hydride, and di-n-hexylaluminum hydride, and most preferred cocatalyst is triethylaluminum.

In one embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In one embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In one embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C3_{-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In one embodiment, the silane composition is dicyclopentyldimethoxysilane, methylcyclohexyldimethoxysilane, diisopropyldimethoxysilane, n-propyltrimethoxysilane, diethylaminotriethoxysilane, or n-propyltriethoxysilane, and any combination of thereof.

In one embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In one embodiment, the external electron donor is selected from one or more of the following: a benzoate, a succinate, and/or a diol ester. In an embodiment, the external electron donor is 2,2,6,6-tetramethylpiperidine. In another embodiment, the external electron donor is a diether.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or polycarboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, octyl acetate, ethyl p-chlorobenzoate, hexyl p-aminobenzoate, isopropyl naphthenate, n-amyl toluate, ethyl cyclohexanoate, pentyl valerate, and propyl pivalate.

In one embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In one embodiment, the mixture is dicyclopentyldimethoxysilane and isopropyl myristate, dicyclopentyldiniethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In one embodiment, the catalyst composition includes any of the foregoing external electron donors in combination with any of the foregoing activity limiting agents.

The olefin polymerization method in accordance with the present disclosure is carrier out in the presence of a catalyst system comprising a procatalyst of the present invention, a cocatalyst, and optionally an external electron donor. Generally speaking, olefins $CH_2=CHR$, where R is hydrogen or a hydrocarbon radical with 1-12 atoms, are contacted with the catalyst system under suitable conditions to form polymer products. The term polymerization as used in the present disclosure may include copolymerization such as random copolymerization or multi-step copolymerization as used to generate heterophasic copolymers. The polymerization process can be carried out according to known techniques, for example gas phase in fluidized bed or stirred bed reactors, slurry polymerization using an inert hydrocarbon solvent as diluent, or slurry polymerization using liquid monomer as reactant and diluent. The polymerization process can also be a combination or hybrid process, for example a bulk propylene liquid loop reactor connected to a gas phase reactor. The polymerization is generally carrier out at a temperature from 20 to 120° C. and more preferably from about 50 to 90° C.

In one embodiment, the catalyst components, or a portion of the catalyst components, are precontacted before being fed to the polymerization reactor zone. The precontact step is typically conducted at higher concentration and lower temperature conditions than the polymerization reactor zone. In another embodiment the procatalyst can be fed to the reactor separately and contacted with the cocatalyst and external electron donor under polymerization conditions. The organoaluminum cocatalyst is preferably used in a molar amount of about 1-1000, preferably about 100-600, and more preferably about 45-300 relative to the moles of titanium in the procatalyst. The external electron donor is preferably used in a molar amount of about 0.005-1.0, and more preferably about 0.01-0.5 relative to the moles of organoaluminum cocatalyst. At high levels of external electron donor the ability to further reduce amorphous polypropylene, as measured by xylene solubles, diminishes and catalyst activity can decrease. Procatalysts of the present disclosure can reach a low xylene solubles level before the point of diminishing return feeding the external electron donor is reached. In some cases very low XS of 1% or less is achievable.

In an embodiment, a preliminary polymerization step (prepoly) takes place prior to the main polymerization. In another embodiment, the main polymerization is carried out without a prepoly step. When prepoly is used it can be conducted batch-wise and prepoly catalyst subsequently fed to the polymerization process. Alternatively, the catalyst can be fed to a continuous polymerization process and a prepoly step conducted as part of the process. Prepoly temperature is preferably in the range of −20 to +100° C., more preferably −20 to +80° C. and most preferably 0 to +40° C. It is possible to improve the catalytic activity, stereoselectivity, particle fragmentation, and resulting polymer morphology by conducting a prepoly step.

Hydrogen is typically added as chain transfer agent to control polymer molecular weight. Different polymerization processes have different limits on the amount of hydrogen that can be added to lower polymer molecular weight. Procatalysts of the present disclosure have increased sensitivity to hydrogen thus improving the molecular weight control capability of the process and expanding the types of polymer that can be produced.

The following examples are given in order to illustrate the invention without limiting it.

Characterizations

Melt flow rate was measured in accordance with ASTM D 1238-01 test method at 230° with a 2.16 kg weight for propylene-based polymers. Xylene Solubles (XS) was measured using a Crystex automated instrument by Polymer Char. The Crystex was calibrated with polypropylene homopolymer samples analyzed for XS by ASTM D 5492-10 test method. Polydispersity Index (PDI) was measured using a Rheometrics 800 cone and plate rheometer from TA Instruments, operated at 180° C., using the method of Ziechner and Patel, (1981) "A Comprehensive Study of Polypropylene Melt Rheology" Proc. Of the 2nd World Congress of Chemical Eng., Montreal, Canada. In this method the cross-over modulus is determined, and the PDI defined as 100,000/cross-over modulus (in Pascals).

EXAMPLES

Example 1

Spherical $MgCl_2$ precursor preparation has been described previously (see U.S. Pat. No. 5,468,698). A sample with average particle size of 58 micron (Malvern d50) was used for procatalyst synthesis.

Procatalyst preparation: MgCl2 precursor (20 g) and octane (70 mL) were added to a 1 L jacketed glass reactor with overhead stirring and the mixture was cooled to −20° C. TiCl4 (340 g pre-cooled to −20° C.) was added and the temperature was increased to 20° C. over a 1.5 h period. A solution of 4,4-bis(methoxymethyl)-2,6-dimethylheptane ("DE1", 1.8 g) in octane (5 mL) was added by microcannual. After completing the addition, reactor temperature was increased to 100° C. at a rate of 0.89° C./min. During the temperature ramp a solution of 3-methyl-5-tert-butyl-1,2phenylene dibenzoate ("CDB", 2.5 g) in toluene (25 mL) was metered by syringe pump at a rate of 0.428 mL/m in. After reaching 100° C., stirring was continued for 1 h before allowing catalyst solids to settle and decanting the supernatant. Pre-heated TiCl4 (340 g) was added and the mixture stirred for 0.5 h before repeating the settle and decant steps. TiCl4 treatment was repeated at 120° C. for 0.5 h and then the reactor was cooled to 80° C. Catalyst solids were washed with heptane at 80° C. (3×200 mL) and at 25° C. (2×200 mL). After final heptane wash the catalyst was dried under vacuum at 40° C. for 4 h to a free flowing powder. Yield: 7.2 g (3.5% Ti, 9.2% DE1, 10.1% CDB)

Example 2

Proctalyst composition was prepared as described in Example 1 except 2.25 g of DE1 and 1.1 g of CDB were used. Yield: 7.9 g (3.4% Ti, 14.3% DE1, 4.8% CDB)

Example 3

Procatalyst was prepared as described in Example 1 except a solution of 9,9-bis(methoxymethyl)-9H-fluorene ("DE2", 2.2 g) in toluene (20 mL) was used instead of DE1 as the first donor. Yield: 9.8 g (3.8% Ti, 11.2% DE2, 9.3% CDB).

Comparative 1

Procatalyst preparation: Spray crystallized MgCl2 carrier (1.90 kg) and heptane (4.67 kg) were added to a 50 L agitated, jacketed metal reactor and the mixture was cooled to −20° C. TiCl4 (32.8 kg pre-cooled to −20° C.) was added over 480 min. The temperature was ramped to 20° C. over a 2.0 h period. Ethylbenzoate (0.143 kg) in was then added. After completing the addition, reactor temperature was increased linearly to 100° C. over 150 min. During the temperature ramp a solution of CDB (0.370 kg) in toluene (2.47 kg) was metered into the reactor at a rate of 0.0247 kg/min. After reaching 100° C., stirring was continued for 30 min before allowing catalyst solids to settle and decanting the supernatant. Pre-heated TiCl4 (100° C., 32.8 kg) was added, a solution of CDB (0.185 kg) in toluene (1.24 kg) was added, and the mixture was stirred for 30 min at 100° C. before repeating the settle and decant steps. TiCl4 treatment without addition of donor was repeated at 120° C. for 15 min and then the reactor was cooled to 95 C over 15 min. The solids were then allowed to settle and the supernatant was decanted. Catalyst solids were washed with heptane at 80° C. (3×13.0 kg) and at 25° C. (2×13.0 kg). After final heptane wash the catalyst was dried under vacuum starting at 25° C. and finished at 40° C. to produce a free flowing powder. Yield: 1.25 kg (3.7 wt % Ti, 10.8 wt % CDB).

Comparative 2

Procatalyst preparation: Spray crystallized MgCl2 carrier (20 g) and octane (70 mL) were added to a 1 L jacketed glass reactor with overhead stirring and the mixture was cooled to −20° C. TiCl4 (340 g pre-cooled to −20° C.) was added and the temperature was increased to 20° C. over a 1.5 h period. A solution of DE1 (2.5 g) in octane (7 mL) was added by microcannual. After completing the addition reactor temperature was increased to 110° C. at a rate of 1.0° C./min. After reaching 110° C., stirring was continued for 1 h before allowing catalyst solids to settle and decanting the supernatant. Pre-heated TiCl4 (340 g) was added and the mixture stirred for 0.5 h before repeating the settle and decant steps. TiCl4 treatment was repeated a second time for 0.5 h and then the reactor was cooled to 80° C. Catalyst solids were washed with heptane at 80° C. (3×200 mL) and at 25° C. (2×200 mL). After final heptane wash the catalyst was dried under vacuum at 40° C. for 4 h to a free flowing powder. Yield: 9.0 g (4.1% Ti, 13.9% DE1).

Comparative 3

A commercial catalyst with diisobutylphthalate as internal donor was used.

Example 4

Procatalysts were used in liquid polypropylene polymerizations at 70° C.: A cocatalyst solution was prepared by mixing 2.23 mmol of triethylaluminum and 0.15 mmol of dicyclopentyldimethoxysilane (DCDMS) in 15 mL of heptane. To a dry 2 L stainless steel autoclave reactor at 20° C. was added 300 mL of liquid propylene. The propylene was then vented off to ~5 psig reactor pressure and 188 mmol of hydrogen were added. A portion of the cocatalyst solution (6 mL) was added to the reactor with 600 mL of propylene and stirring initiated at 500 rpm. The remaining cocatalyst solution was contacted with the procatalyst for 5 minutes and charged to the reactor with 450 mL of propylene. The reactor was heated to 70° C. in 10 minutes and polymerization continued for 1 h. The stirrer was turned off; excess monomer vented while cooling to 20° C.; and the reactor was purged for 5 minutes with argon. The reactor bottom was dropped and polymer removed. Polymer was dried in a vacuum oven at 50° C. before weighing and analysis. Results are collected in Table 1.

Example 5

Procatalysts were used in propylene polymerization as described in Example 5 except 0.15 mmol of cyclohexylmethyldimethoxysilane (CMDMS) was used as external donor and the hydrogen charge was 63 mmol. Results are summarized in Table 2.

TABLE 1

Bulk polytests with DCDMS external donor

| Catalyst (mg) | Activity (Kg/g-cat*h) | MFR (g/10 min.) | XSRT (wt %) |
|---|---|---|---|
| Exp-1 (2.15) | 88 | 58.8 | 1.72 |
| Exp-2 (2.50) | 81 | 68.9 | 1.44 |
| Exp-3 (2.05) | 93 | 73.7 | 0.99 |
| C1 (2.40) | 92 | 10.8 | 1.35 |
| C2 (2.95) | 77 | 175.2 | 3.34 |
| C3 (4.50) | 63 | 17.0 | 1.77 |

TEAl/DCDMS = 15, H$_2$ charge = 188 mmol.

TABLE 2

Bulk polytests with CMDMS external donor

| Catalyst (mg) | Activity (Kg/g-cat*h) | MFR (g/10 min.) | XSRT (wt %) | PDI (Pa) |
|---|---|---|---|---|
| Exp-1 (3.00) | 90 | 3.2 | 1.28 | 4.6 |
| Exp-2 (2.70) | 89 | 6.4 | 2.54 | 4.6 |
| Exp-3 (2.60) | 106 | 6.1 | 0.98 | |
| C1 (2.55) | 90 | 1.5 | 2.22 | 5.3 |
| C2 (2.50) | 77 | 23.5 | 4.00 | 3.8 |
| C3 (5.20) | 48 | 5.3 | 2.20 | 4.3 |

TEAl/CMDMS = 15, H$_2$ charge = 68 mmol.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention as further described in such appended claims.

What is claimed:

1. A procatalyst composition for stereoselective polymerization of propylene comprising:
   a combination of a magnesium moiety, a titanium moiety, and a mixed internal electron donor, the mixed internal electron donor comprising at least a first internal electron donor and a second internal electron donor, the first internal electron donor comprising a non-phthalate substituted phenylene aromatic diester internal electron donor, the second internal electron donor comprising a 1,3-diether.

2. A procatalyst composition as defined in claim 1, wherein the first internal electron donor and the second internal electron donor are present in the composition in a molar ratio of from about 10:1 to about 1:10.

3. A procatalyst composition as defined in claim 1, wherein the second internal electron donor has the following structure:

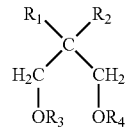

where $R_1$, $R_2$, $R_3$, and $R_4$ are the same or different and comprise methyl, $C_2$-$C_{18}$ linear or branched alkyls, $C_3$-$C_{18}$ cycloalkyls, $C_4$-$C_{18}$ cycloalkyl-alkyls, $C_4$-$C_{18}$ alkyl-cycloalkyls, phenyls, organosilicons, $C_7$-$C_{18}$ arylalkyls, $C_7$-$C_{18}$ alkylaryl radicals; and where $R_1$, $R_2$ or both optionally are a hydrogen atom.

4. A procatalyst composition as defined in claim 1, wherein the second internal electron donor has the following structure:

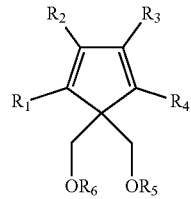

where $R_1$-$R_6$ are the same or different and comprise a methyl, a $C_2$-$C_{18}$ linear or branched alkyl, a $C_3$-$C_{18}$ cycolalkyl, a $C_4$-$C_{18}$ cycolalkyl-alkyl, a $C_4$-$C_{18}$ alkyl-cycolalkyl, a phenyl, an organosilicon, a $C_7$-$C_{18}$ arylalkyl, or a $C_7$-$C_{18}$ alkylaryl radical, and where $R_1$-$R_4$ are optionally a hydrogen atom or are combined to form one or more $C_5$-$C_7$ fused aromatic or non-aromatic ring structures, optionally containing an N, O, or S heteroatom.

5. A procatalyst composition as defined in claim 1, wherein the second internal electron donor comprises a bis(methoxymethyl)alkane.

6. A procatalyst composition as defined in claim 1 wherein the second internal electron donor comprises a substituted bis(methoxymethyl) cyclopentadiene.

7. A procatalyst composition as defined in claim 1, wherein the second internal electron donor comprises 9,9-bis(methoxymethyl)fluorene.

8. A procatalyst composition as defined in claim 1, wherein the second internal electron donor comprises 4,4-bis(methoxymethyl)-2,6-dimethyl heptane.

9. A procatalyst composition as defined in claim 1, wherein the combined magnesium moiety, titanium moiety, and mixed internal electron donors form a substantially spherical shaped particle.

10. A procatalyst composition as defined in claim 1, wherein the magnesium moiety comprises a magnesium-based spherical carrier.

11. A procatalyst composition as defined in claim 1, wherein the substituted phenylene aromatic diester has the following structure:

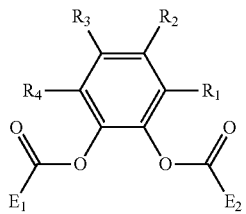

where $R_1$-$R_4$ is the same or different, each of $R_1$-$R_4$ is selected from the group consisting of hydrogen, a substituted hydrocarbyl group having 1 to 20 carbon atoms, an unsubstituted hydrocarbyl group having 1 to 20 carbon atoms, a substituted or unsubstituted aryl group having 6 to 20 carbon atoms, an alkoxy group having 1 to 20 carbon atoms, a heteroatom, and combinations thereof, and at least one of $R_1$-$R_4$ is not hydrogen; and at least one or two, or three, or four R groups of $R_1$-$R_4$ is selected from a substituted hydrocarbyl group having 1 to 20 carbon atoms, an unsubstituted hydrocarbyl group having 1 to 20 carbon atoms, a substituted or unsubstituted aryl group having 6 to 20 carbon atoms, an alkoxy group having 1 to 20 carbon atoms, a heteroatom, and combinations thereof, and where $E_1$ and $E_2$ are the same or different and selected from the group consisting of an alkyl having 1 to 20 carbon atoms, a substituted alkyl having 1 to 20 carbon atoms, an aryl having 1 to 20 carbon atoms, a substituted aryl having 1 to 20 carbon atoms, or a heteroatom containing functional group having 1 to 20 carbon atoms.

12. A catalyst system for the polymerization of propylene polymers comprising:
the procatalyst composition as defined in claim 1; and
a cocatalyst.

13. A catalyst system as defined in claim 12, wherein the system further comprises an external electron donor.

14. A catalyst system as defined in claim 12, further comprising an activity limiting agent.

15. A polymerization process comprising:
polymerizing an olefin in the presence of a catalyst composition comprising a Ziegler-Natta procatalyst composition, a cocatalyst composition, and optionally an external electron donor compound, the procatalyst composition formed from a transition metal compound and a mixture of internal electron donors comprising at least a first internal electron donor and a second internal electron donor, the first internal electron donor comprising a non-phthalate phenylene dicarboxylic acid ester, the second internal electron donor comprising a 1,3-diether.

16. A process as defined in claim 15, wherein the process produces a polypropylene polymer.

17. A process as defined in claim 15, wherein the second internal electron donor comprises the following structure:

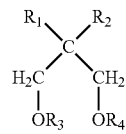

where $R_1$, $R_2$, $R_3$, and $R_4$ are the same or different and comprise a methyl, a $C_2$-$C_{18}$ linear or branched alkyls, a $C_3$-$C_{18}$ cycloalkyls, a $C_4$-$C_{18}$ cycloalkyl-alkyls, a $C_4$-$C_{18}$ alkyl-cycloalkyls, phenyl, an organosilicon, a $C_7$-$C_{18}$ arylalkyls, or a $C_7$-$C_{18}$ alkylaryl radicals and where $R_1$, $R_2$ or both optionally are a hydrogen atom.

18. A process as defined in claim 15, wherein the second internal electron donor comprises the following structure:

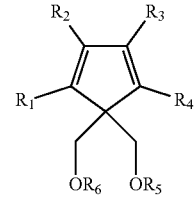

where $R_1$-$R_6$ are the same or different and comprise a methyl, a $C_2$-$C_{18}$ linear or branched alkyl, a $C_3$-$C_{18}$ cycolalkyl, a $C_4$-$C_{18}$ cycolalkyl-alkyl, a $C_4$-$C_{18}$ alkyl-cycolalkyl, a phenyl, an organosilicon, a C7-C18 arylalkyl, or a C7-C18 alkylaryl radical, and where $R_1$-$R_4$ are optionally a hydrogen atom or combined to form one or more $C_5$-$C_7$ fused aromatic or non-aromatic ring structures, optionally containing an N, O, or S heteroatom.

19. A process as defined claim 15, wherein the olefin comprises propylene and ethylene for forming a propylene and ethylene copolymer.

20. A process as defined in claim 15, wherein the second internal electron donor comprises a bis(methoxymethyl)alkane, a substituted bis(methoxymethyl)cyclopentadiene, 9,9-bis(methoxymethyl)fluorene, and/or 4,4-bis(methoxymethyl)-2,6-dimethyl heptane.

* * * * *